US007565700B2

(12) United States Patent
Bellwood et al.

(10) Patent No.: US 7,565,700 B2
(45) Date of Patent: Jul. 21, 2009

(54) METHOD FOR TRACKING THE EXPIRATION OF ENCRYPTED CONTENT USING DEVICE RELATIVE TIME INTERVALS

(75) Inventors: Thomas Alexander Bellwood, Austin, TX (US); Robert Bryant Chumbley, Austin, TX (US); Matt Francis Rutkowski, Pflugerville, TX (US); Alexander H. Tarpinian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 11/174,966

(22) Filed: Jul. 5, 2005

(65) Prior Publication Data

US 2007/0016956 A1    Jan. 18, 2007

(51) Int. Cl.
  *G06F 7/04* (2006.01)
  *H04L 9/00* (2006.01)
(52) U.S. Cl. ............................ 726/27; 713/176; 705/59
(58) Field of Classification Search ................ 726/30
  See application file for complete search history.

(56) References Cited

U.S. PATENT DOCUMENTS

| 5,825,876 A * | 10/1998 | Peterson, Jr. ............ 705/52 |
| 6,993,137 B2 * | 1/2006 | Fransdonk ............ 380/279 |
| 7,116,969 B2 * | 10/2006 | Park ............ 455/410 |
| 7,430,754 B2 * | 9/2008 | Speare et al. ............ 726/1 |
| 7,472,280 B2 * | 12/2008 | Giobbi ............ 713/182 |
| 2002/0120578 A1 * | 8/2002 | Sy ............ 705/59 |
| 2004/0243808 A1 * | 12/2004 | Ishiguro et al. ............ 713/176 |
| 2006/0064762 A1 * | 3/2006 | Kayashima et al. ............ 726/27 |
| 2006/0248596 A1 * | 11/2006 | Jain et al. ............ 726/27 |
| 2006/0294017 A1 * | 12/2006 | Kim et al. ............ 705/59 |
| 2007/0168294 A1 * | 7/2007 | Tsurukawa ............ 705/59 |

\* cited by examiner

*Primary Examiner*—Matthew B Smithers
(74) *Attorney, Agent, or Firm*—Jill A. Poimboeuf; Gregory K Goshorn; Greg Goshorn, P.C.

(57) ABSTRACT

Provided is a method for enabling a device without a secure clock to make a determination on the expiration of encrypted content. When the device receives content, the device also receives the content provider's policy on access. This information provides an ATI in UTI units which is to be associated with the content for the purpose of managing the content's expiration. The ATI is converted to the device's DTI units and the DTI is then used to control the availability of the content for decryption and use. The claimed subject matter permits the existence of tolerance, determined by content policy, in the conversion between UTI and the DTI, as well as in the depletion of the ATI. To move or copy content which has an associated remaining ATI, the device converts the ATI into UTI units and provides converted ATI to the target device in conjunction with the associated content.

1 Claim, 6 Drawing Sheets

METHOD FOR TRACKING THE EXPIRATION OF ENCRYPTED CONTENT USING DEVICE RELATIVE TIME INTERVALS

TECHNICAL FIELD

The present invention relates generally to digital content management and, more specifically, to a method for controlling the expiration of encrypted content in a key management based system.

BACKGROUND OF THE INVENTION

The rapid advancement of digital media in the areas such as music and movies has given rise to content protection issues. Unlike content stored in analog form, content stored in a digital form can, in the absence of some protection mechanism, be easily and accurately copied and distributed almost without limits. Of course, this issue is very significant to owners and producers of such digital content. While there are legal remedies to protect content owners and producers, these parties have increasingly turned to techniques that provide the parties themselves control over the reproduction and use of content. Typically, these techniques employ some form of data encryption.

Encryption of messages, information and data has been around almost as long as writing. Julius Caesar employed a system that substituted one letter for another; Leonardo Da Vinci wrote manuscripts in a reverse image so that they could only be read in a mirror. One current method of protecting data is a private key encryption, or "shared key," system in which a key, known only to a sender and a recipient, is used to encrypt and decrypt a message.

In the early 1970's, a private key encryption system called Data Encryption Standard algorithm (DES) was introduced, which uses a fifty-six (56) bit key to encrypt and decrypt information. DES splits a message into blocks and then encodes each block. DES is no longer considered adequately secure because a 56 bit key can be broken in a relative short time by trying every possible key. DES has since been superseded by the Advanced Encryption Standard (AES), using what is known as the Rijndael algorithm. AES operates with 128, 192 or 256 bit keys. These keys are considered long enough to be safe for the foreseeable future as they would take millions of millions of years for the fastest currently available computers to break.

A second current method for protecting data is public key encryption, which has been around for approximately twenty-five (25) years. Public key encryption involves the use of two keys: a public key, know to everyone, and a private key, known only to the recipient of a message. Although public key encryption is very effective, there are several drawbacks when it is applied in the realm of digital content protection. First, public key encryption is computationally expensive, i.e. public key systems require such significant computational capacity they are normally only used to implement a key exchange process within a private key encryption system, not to encrypt the body of a message. This process requires a two-way communication, which is not necessarily available in the distribution of protected media. Secondly, once the private key of a public key system has been compromised, the system becomes a shared key system. Thirdly, once a public key system has been compromised, there is no practical method for "revoking" the compromised private key.

Another example of a protection scheme for digital media is digital video disk (DVD) media, which was first sold in Tokyo, Japan in 1996, relies upon a Content Scrambling System (CSS). CSS relies upon a shared secret code. The CSS code was broken by a hacker in 1999 and it is now easy to find programs on the Internet that will decrypt a DVD protected by CSS. Now that the system has been cracked, there is no way to fix it without redesigning the entire system. In other words, the shared code that forms the basis of CSS can not be revoked and a new code issued as a replacement.

A recent development in the field of encryption of digital media is broadcast encryption. Broadcast encryption are based upon a key management block (KMB), which is a block of data sent at the beginning of a broadcast or is prerecorded on blank media during the manufacturing process. One of the largest advantages to broadcast encryption is that two devices, which might be previously unknown to each other, can agree upon a key over a one-way communication path. This advantage makes broadcast encryption ideal for the downloading of digital content from a server to a user.

The International Business Machines Corporation (IBM) of Armonk, N.Y., a leader in broadcast encryption, has developed a content protection system referred to as eXtensible Content Protection (xCP) designed for networks and media distribution. This technology is based on broadcast encryption and supports the notion of a trusted domain that groups together compliant devices. Content can freely move among devices within the trusted domain but is useless to devices that are outside of the domain. XCP provides a cryptographically strong yet extremely flexible model for access to copy-protected content within a network of devices.

Based on IBM's experience with broadcast encryption, xCP was designed to meet the following requirements:
 1. Cryptographically strong;
 2. Easy to use, if not transparent, to consumers;
 3. Low compute requirements;
 4. Exclusion/renewal in the case of a breach;
 5. Compatible with rights management and other copy protection systems; and
 6. Encourages the implementation of new content owner business models.

Extensible content protection (xCP) makes use of the key management scheme described by broadcast encryption and can be thought of as a superset of the successful content protection technology used and licensed today by IBM on DVDs, High Definition DVDs (HDVDs) and Compact Disks (CDs) called Content Protection for Recordable Media (CPRM).

Public-key based systems, which require devices to have a two-way conversation to establish a key, are almost impossible to completely divorce from an underlying transmission protocol. The IBM xCP Cluster Protocol may be the first system directed to peer devices based upon broadcast encryption as the underlying cryptographic technology. Devices that implement the xCP Cluster Protocol and its broadcast encryption mechanisms are said to "bind" the content they protect to a particular entity (e.g. a home network or cluster) by encrypting the content with a different key, called the binding key (Kb), than the one produced by processing a KMB, as explained below. All current approaches to binding a piece of content to a particular entity, regardless of whether it is a piece of media, a device, or a user, is through one level of indirection in the calculation of the encryption keys. In these cases, the procedure to encrypt a piece of content is roughly the following:
 1. Extract a Management Key (Km) by processing the KMB.

2. Perform a one-way function to a piece of data that uniquely identifies the entity this content is being bound to (or the "IDb"), using Km and resulting in a binding key (i.e. Kb=G(Km, IDb)).
3. Choose a random title key (Kt) for this piece of content and encrypt it using Kb, resulting in an encrypted title key (EKt) (i.e. EKt=E(Kb, Kt)).
4. The content is encrypted with the Kt and then the encrypted content is stored in conjunction with the EKt.

Once the procedure has been implemented, any compliant device that has access to the same KMB, IDb and EKt can decrypt the content by reproducing the same Kb and decrypting Kt.

In various binding scenarios there is more than one piece of content that is bound to the same entity and, at the same time, either the KMB or IDb can change. The result of this is that the value of Kb changes and thus all the existing title keys need to be re-encrypted with the new value of Kb—otherwise, no device would be able to open the content again. It should be noted that encrypted content of this nature is routinely exchanged and/or copied between entities which participate in the described binding scheme.

One issue that arises in the context of content protection is providing for the expiration of the right to access material. For example, a user who downloads a movie may pay for the right to display that movie for forty-eight (48) hours. The current art for managing encrypted content that is subject to expiration relies upon comparing a standard timestamp against a secured clock. This method requires that both a secure clock and a communication link to the secure clock are always available. What is needed is a method that allows a device to make a determination on the expiration of encrypted content without requiring either access to a secure clock, whether the clock is local or remote, or a functional communication link.

SUMMARY OF THE INVENTION

Provided is a method for enabling a device to make a determination on the expiration of encrypted content without requiring access to a secure clock. Those with skill in the computing arts should appreciate that such content may be stored on many types of media such as, but not limited to, compact disks (CDs), digital video disk (DVDs), flash memory, secure digital (CD) cards and other physical storage mechanisms.

We define the concept of a "Universal Time Interval" (UTI), which all participating devices agree to use as the standard for measuring time. We define the concept of a "Device Time Interval" (DTI), which a device employs to establish a repeatable time based measurement mechanism, based upon the device's own operational characteristics. DTI can be converted to the established UTI or based upon the presence of a local timer or clock on the device, which is not necessarily based upon UTI. We define the concept of an "Availability Time Interval" (ATI), which is the period of time a user is allowed access to unencrypted content.

When a device accepts ownership of a content item, which is either already encrypted through a move or copy from a DVD or CD, or ingested, i.e., encrypted by the device itself, the device has access to the content provider's policy on access. This information provides an ATI in UTI units which is to be associated with the content for the purpose of managing the content's expiration. The ATI is converted to DTI units for the particular device and the DTI then used to control the availability of the content for decryption and use.

Two examples for managing the expiration, or the ability to decode, encrypted content using ATI are as follows:
1. Usage Based Control (UBC): The ATI describes the total length of time for which the content may be played or used (for example, a video may be played for a total of 6 hrs). The device only decrements the ATI while unencrypted content is being played or used. This approach requires the device to keep status data on the remaining time interval.
2. Acquisition Based Control (ABC): The ATI is continuously depleted while the device is activated and/or the content is accessible. It is not depleted while the device is inactive, but depletion resumes when the device is turned back on.

Both of these methods assume that the device is able to save the ATI and other relevant status formation across de-activation using non-volatile storage or a similar approach.

Other metrics of the depletion behavior such as granularity, i.e. how often the interval is reduced and persisted, are factors which can be established through policies based on license agreements with the content provider or service provider. The claimed subject matter permits the existence of tolerance, determined by content provider policy, in the conversion between UTI and the DTI, as well as in the depletion of the ATI, as long as this tolerance still results in the expiration of the content. In order to move or copy content which has an associated remaining ATI, the device converts the ATI into UTI units and provides converted ATI to the target device in conjunction with the associated content. Content may be copied when the Copy Control Information (CCI) specific to that content permits this behavior.

BRIEF DESCRIPTION OF THE DRAWINGS

A better understanding of the present invention can be obtained when the following detailed description of the disclosed embodiments is considered in conjunction with the following drawings.

DETAILED DESCRIPTION OF THE FIGURES

Figure 1:
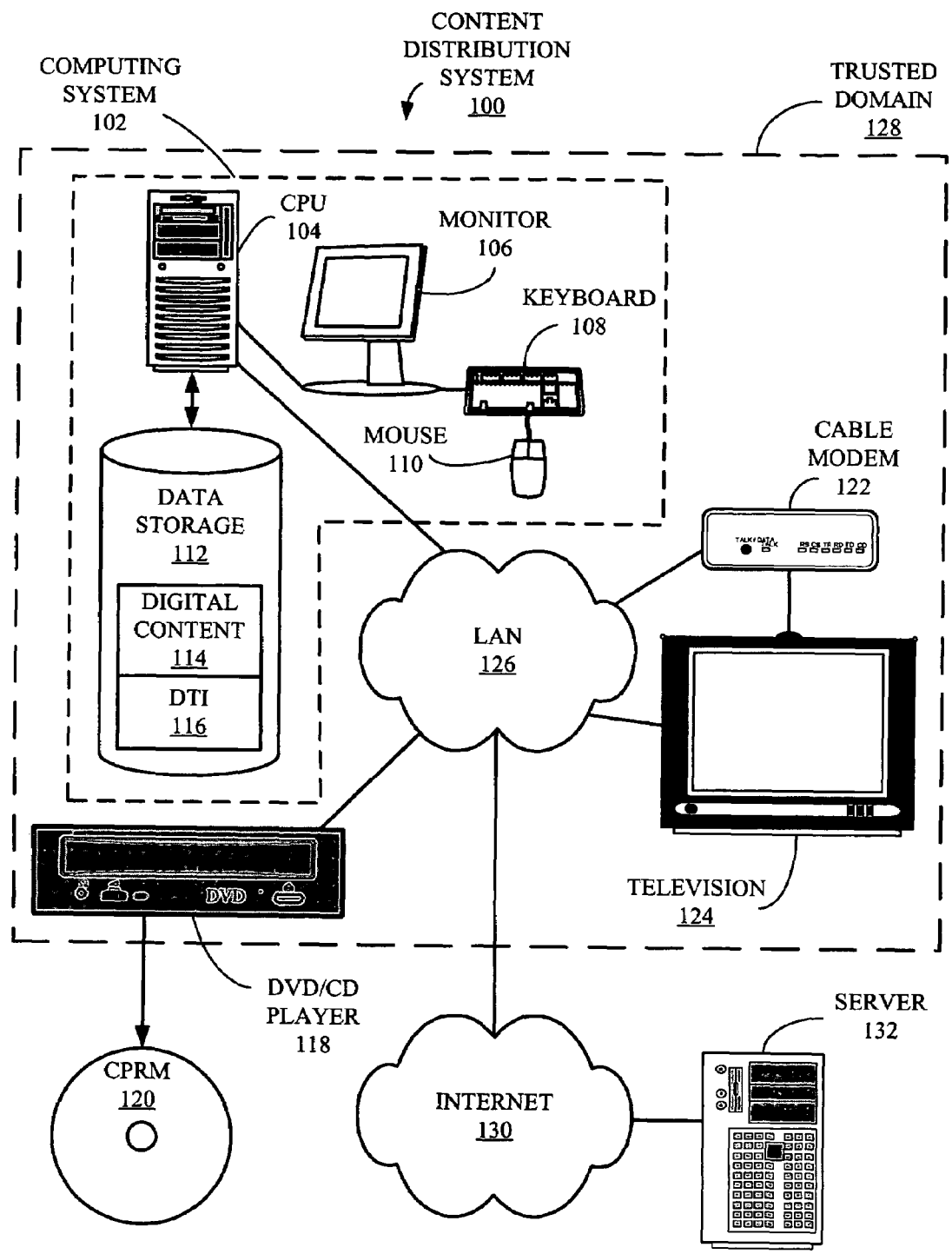
FIG. 1 is a block diagram of an exemplary content distribution system that employs the claimed subject matter.

Although described with particular reference to broadcast encryption and digital content, the claimed subject matter can be implemented in any encryption system in which the timed expiration of content, either digital or analog, is desirable. In addition, those with skill in the computing and cryptographic arts will recognize that the disclosed embodiments have relevance to a wide variety of computing environments and content distribution systems in addition to those described below. Further, although described with respect to eXtensible Content Protection (xCP) and the downloading of music and movies, the claimed subject matter also is applicable to the licensed transfer of content such as databases, images, and so on. In other words, the disclosed technology is applicable to any situation in which there is a licensed transfer of content, regardless of whether that the license is explicit or implied.

In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject matter, is directed to a programmed method for enabling a device to make a determination on the expiration of encrypted content without requiring access to a secure clock. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

FIG. 1 is a block diagram of an exemplary content distribution system 100 that employs the claimed subject matter. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing exemplary digital content 114, which is described in more detail below in conjunction with FIG. 3. It should be noted that although digital content 114 is described as digital data, there is no requirement that content protected by the claimed subject matter be digital in nature. The claimed subject matter is equally applicable to analog content. Digital content 114 is used merely as an example for the purposes of illustration. Stored in conjunction with digital content 114 is a device time interval (DTI) 116. As explained above in conjunction with the Summary of the Invention, DTI 116 is employed to establish a repeatable time based measurement mechanism, based upon the operational characteristics of, in this example, CPU 104. DTI is explained in more detail below in conjunction with FIGS. 3-6.

Computing system 102 is part of a trusted domain 128. In general, a trusted domain is a group of devices that adhere to the standards of the claimed subject matter and are able to freely share digital content that is authorized for use by any one of them. Trusted domain 128 also includes a digital video device/compact disk (DVD/CD) player 118, a cable modem 122 and a television 124. Devices 102, 118, 122 and 124 are used merely as examples of types of devices that might be included in a trusted domain such as trusted domain 128. Those with skill in the arts should appreciate that are many types of devices that would benefit form the ability to freely share digital content that is otherwise protected from devices outside of a trusted domain.

Devices 102, 118, 122 and 124 of trusted domain 128 are communicatively coupled via a local area network (LAN) 126. Of course, there are many options for coupling such devices including direct connections, wireless connections and even over multiple interconnected LANs (not shown), a metro area network (MAN) or a wide area network (WAN). In addition, there could be devices (not shown) coupled to LAN 126 or any of devices 102, 118, 122 or 124 that are not included in trusted domain 128. A disk 120 implementing, in this example, Content Protection for Recordable Media (CPRM) is produced by DVD/CD player 118. Disk 120 includes information for implementing the claimed subject matter. It should be noted that CPRM disk 120 is used merely as an example of one of multiple possible content protection schemes. One other example is the Advanced Access Content System (AACS) developed by a consortium including IBM and other companies.

LAN 126 is coupled to the Internet 130, which is communicatively coupled to a server 132. In the following description, server 132 is used as an example of a source of downloaded digital content. Although in this example, computing system 102 and server 132 are communicatively coupled via LAN 126 and the Internet 130, they could also be coupled through any number of communication mediums such as, but not limited to, a direct wire or wireless connection. Further, server 132 could be linked directly to LAN 126 and could be either included in trusted domain 128 or not. In this example, server 132 is not part of trusted domain 128.

Figure 2:
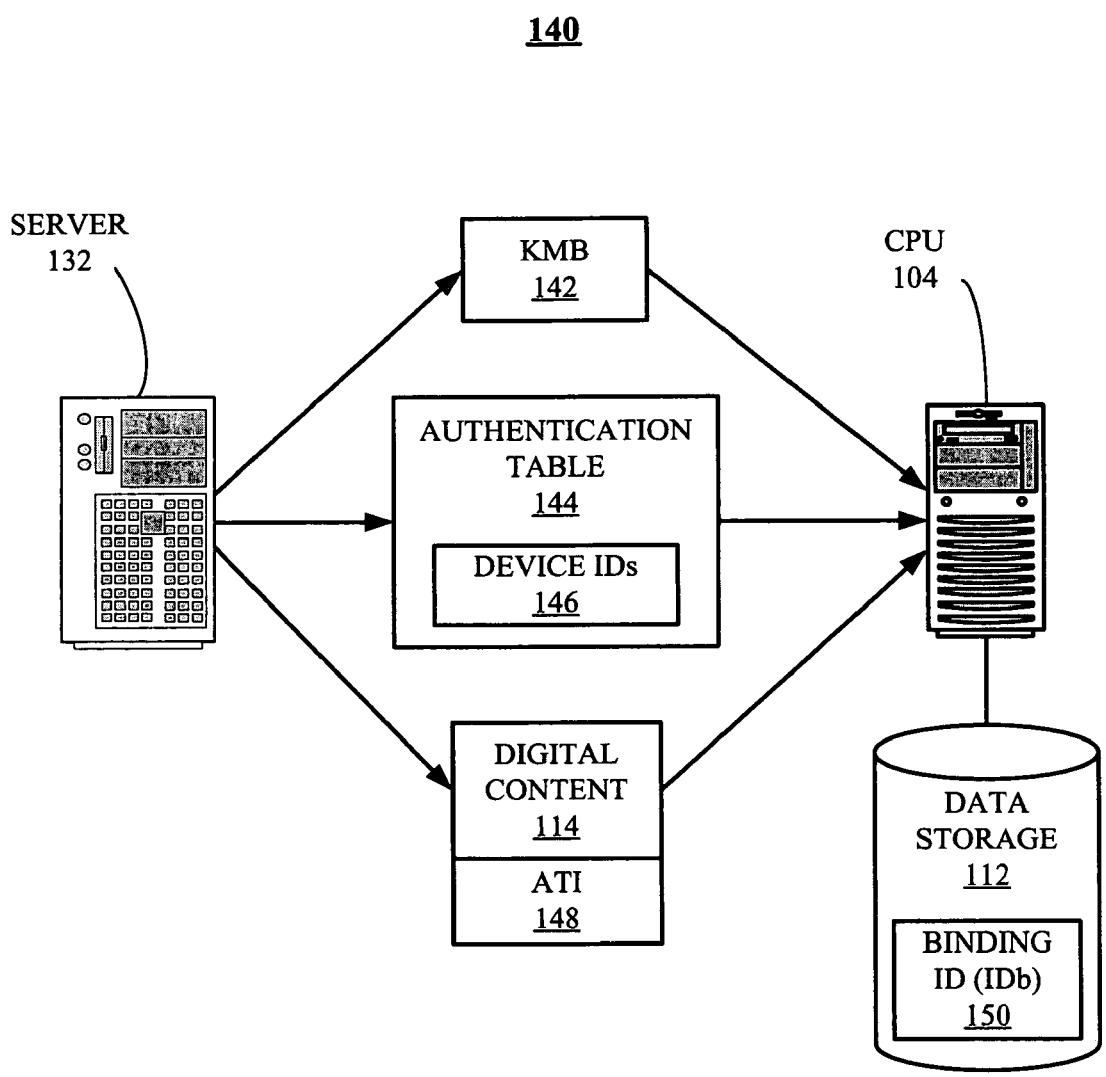
FIG. 2 is a block diagram of a broadcast encryption system implemented on the distribution system of FIG. 1 that supports the techniques of the claimed subject matter.

FIG. 2 is a block diagram of a broadcast encryption system 140, implemented on distribution system 100 of FIG. 1, which supports the techniques of the claimed subject matter. Illustrated in FIG. 2 are CPU 104, data storage 112, server 132 and digital content 114, first introduced above in conjunction with FIG. 1. In this example, digital content 114 is being transmitted from server 132 to computing system 102 (FIG. 1) rather than already stored on data storage 112 as shown in FIG. 1. In addition, in this example, digital content 114 is encrypted by means of xCP, which is explained above in conjunction with the Background of the Invention. Data storage 112 includes a binding ID (IDb) 150, which uniquely identifies the entity to which digital content 114 is being bound, in this example CPU 104.

Illustrated in the process of transmission from server 132 to CPU 104 are a key management block (KMB) 142 and an authentication table 144. Authentication table 144 includes a device identification (ID) list 146 that references devices which possess a licensed set of device keys and are authorized to be part of trusted domain 128. It should be noted that, although in this example, digital content 114, KMB 142 and authentication table 144 are shown being transmitted concurrently, the claimed subject matter makes no such requirement. KMB 142 and authentication table 144 would typically be transmitted at the same time or prior to any attempt to access digital content 114 because they include information necessary for decryption. In fact, the transmission of KMB 142 and authentication table 144 can be repeated multiple times with different information after transmission of digital content 114. For example, an updated KMB 142 may be transmitted in the event that the content provider determines that the original information has been compromised. Authentication table 144 and corresponding device ID list 146 may be retransmitted when a new device has been authorized to join trusted domain 128 or the authorization for a current device is revoked. It should be noted that a transmission of updated KMB 142 and/or authentication table 144 requires that CPU 104 take steps to any digital content associated with KMB 142 and authentication table 144.

In conjunction with digital content 114, an availability time interval (ATI) block 148 is transmitted. ATI 148 includes information used to limit unencrypted access time to digital content 114. The process for limiting access to digital content 114 is explained in detail below in conjunction with FIGS. 3-6.

As described above, the claimed subject matter is a system and method for limiting access to encrypted content based upon a time value. An exemplary process for the encryption of content is described above in the Summary of the Invention and, although relevant to the claimed subject matter, will not be elaborated on further except as it relates to the decryption and the described embodiments. In the following figures, it is assumed that KMB 142 and authentication table 144 have been transmitted by server 132, received by CPU 104 and stored on data storage 112 and are thus available in conjunction with an implementation of the claimed subject matter.

Figure 3:
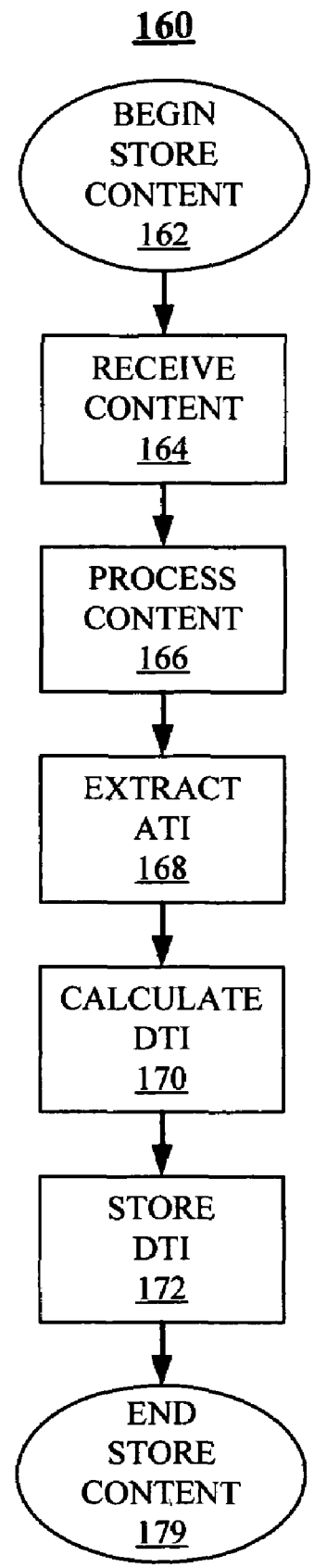
FIG. 3 is a flowchart of a Store Content process that represents one aspect of an exemplary implementation of the claimed subject matter.

FIG. 3 is a flowchart of a "Store Content" process 160 representing one aspect of an exemplary implementation of the claimed subject matter. Process 160 is executed when a device, e.g. CPU 104 (FIGS. 1 and 2), initially accepts ownership for a content item, e.g. digital content 114 (FIGS. 1 and 2). In this example, digital content 114 has been encrypted by server 132 (FIGS. 1 and 2), although the particular device that encrypts digital content 114 is not important. In the alternative, digital content may be encrypted by CPU 104, i.e. "ingested," or copied from a recordable media such as, but not limited to, SD card, flash memory, an optical disc, or CPRM 120 (FIG. 1).

Process 160 starts in a "Begin Store Content" block 162 and proceeds immediately to a "Receive Content" block 164. During block 164, process 160 receives a transmission of protected content. In this example, process 160 executes on CPU 104 and is receiving digital content 114 transmitted from server 132 (FIGS. 1 and 2). As explained above, in this example, digital content 114 has been encrypted using broadcast encryption.

During a "Process Content" block 166, process 160 decrypts digital content 114 using by means of the methods described above in the Summary of the Invention. Although in this example digital content 114 is decrypted to read the ATI and policies, this is implementation dependent. In other embodiments, header information might be included unencrypted in the same file, followed by the encrypted content, or digital content 114 can be managed separately via another file or through another indirection mechanism.

During an "Extract ATI" block 168, process 160 extracts an ATI corresponding to digital content 114 from ATI packet 148 (FIG. 2) transmitted in conjunction with digital content 114. ATI 148 is typically expressed in Universal Time Interval (UTI) units, which all participating devices have previously agreed to use as a standard for time measurements.

During a "Calculate Device Time Interval (DTI)" block 170, process 160 converts the ATI information extracted during block 168 into DTI units. The specific parameters of DTI units are determined by individual devices based upon each device's operating characteristics. In other words, a device, such as CPU 104, establishes a repeatable time measurement based upon the device's operational characteristics, a time measurement that can be accurately converted into an established UTI measurement. It should be noted that DTI may be based upon a local timer or clock on the device that is not based upon UTI. The claimed subject matter permits the existence of a tolerance, as determined by content provider policy, in the conversion of ATI to DTI as well as the depletion of ATI and DTI. The DTI calculated during block 170 is then employed by, in this example, CPU 104 to control the availability of digital content 114. Processes that employ the DTI to control digital content such as digital content 114 are explained in detail below in conjunction with FIGS. 4-6.

During a "Store DTI" block 172, process 160 stores the DTI calculated during block 170 on data storage 112 in conjunction with digital content 114. Finally, in an "End Store Content" block 179, process 160 is complete. Although in this example the DTI is stored within the broadcast protection scheme for the digital content, this is implementation dependent. In another embodiment that employs a clear text DTI, the problem of an attack which uses the clear text DTI may be addressed y storing a redundant DTI in the encrypted content. The redundant DTI could then be compared to the clear text DTI prior to use. Alternatively a checksum or a similar procedure could be used on all or part of the entire header to prevent tampering.

Figure 4:
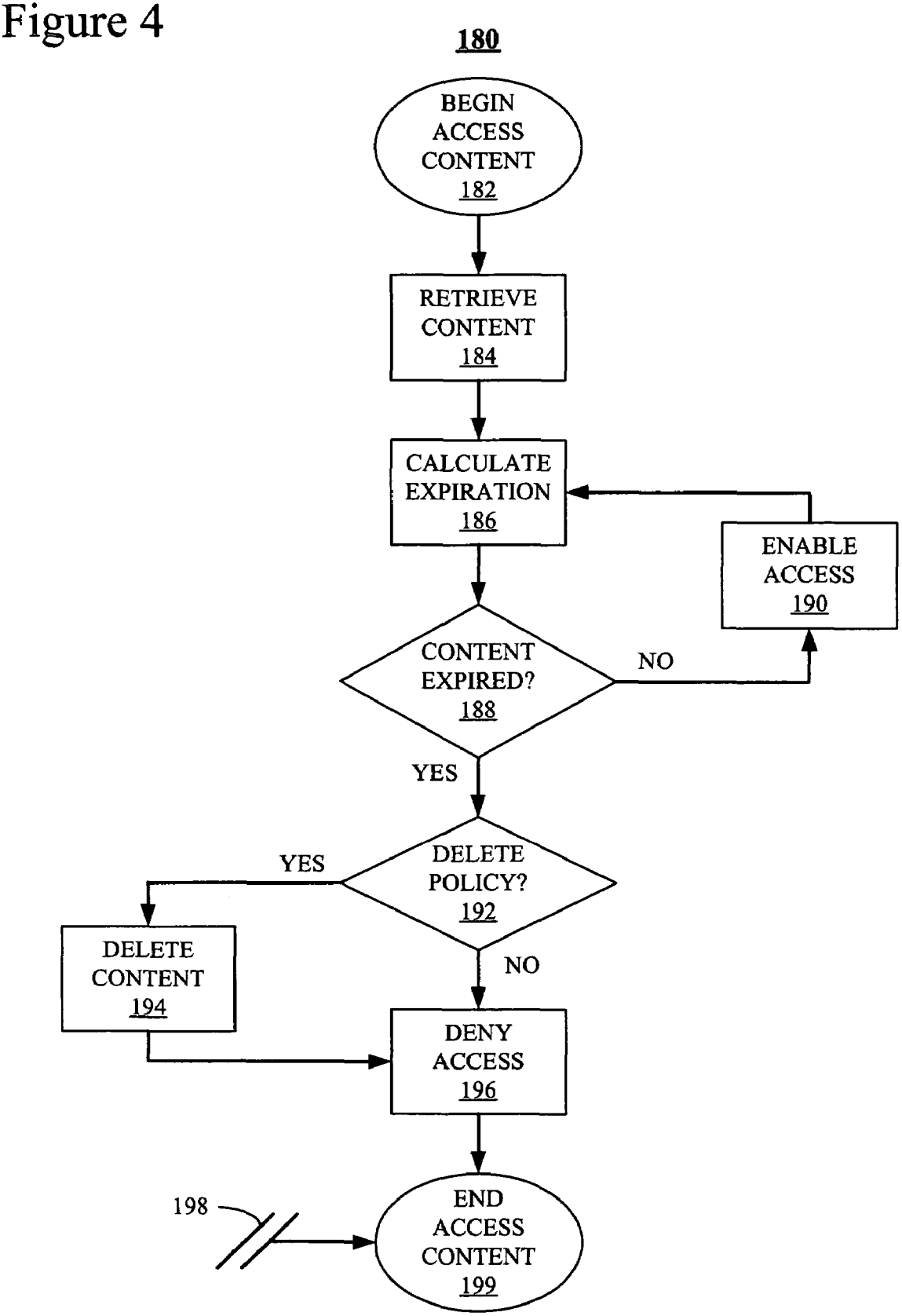
FIG. 4 is a flowchart of an Access Content process that manages content based upon a DTI calculated and stored during the Store Content process described above in conjunction with FIG. 3.

FIG. 4 is a flowchart of an Access Content process 180 that, in this example enables CPU 104 (FIGS. 1 and 2) to access digital content 114 (FIGS. 1 and 2). Process 180 manages the expiration of digital content 114 based upon the DTI calculated and stored during Store Content process 160 described above in conjunction with FIG. 3. Process 180 starts in a "Begin Access Content" block 182 and control proceeds immediately to a "Retrieve Content" block 184. During block 184, process 180, which in this example is executing on CPU 104, retrieves digital content 114 from data storage 112 (FIGS. 1 and 2). During a "Calculate Expiration" block 186, process 180 compares the DTI calculated during Calculate DTI block 170 and stored in conjunction with digital content 114 during Store DTI block 172 of process 160 to a local timer (not shown) of CPU 104, which may or may not be based upon UTI. During a "Content Expired?" block 188, process 180 determines whether or not the content retrieved during block 184 has exceeded the policy limits on use as defined by the content provider.

One exemplary method for calculating the expiration of content, or Usage Based Control (UBC), is based upon the total length of time a particular piece of content may be used. For example, a video played on DVD/CD player 118 (FIG. 1) and displayed on television 124 (FIG. 1) may be allotted six (6) hours of total play time. The device accessing the content, in this example, DVD/CD player 118, decrements the DTI continuously while the content is being played. This approach requires that the device accessing the content maintain a remaining time interval calculation on the content.

A second method of calculating the expiration of playback, or Acquisition Based Control (ABC), continuously depletes the DTI while the accessing device is activated and/or the content is accessible. For example, a user may have unlimited access to a video for twenty-four (24) hours of total play time. If the accessing device is not active, the DTI is updated when the device is turned on. Of course, there are many possible methods for determining the expiration of content, including a determination that a particular piece of content is not subject to expiration at all. Both of the described exemplary methods for calculating expiration of content assume that the accessing device is able to save the DTI and other relevant status information across a device deactivation using secured non-volatile storage or some other approach.

If process 180 determines during block 188 that digital content 114 has not expired, process 180 proceeds to an "Enable Access" block 190 during which digital content 114 is made available to the entity that requested access. Typically, the enabling of access to digital content 114 involves a decryption of digital content 114. This availability may mean that digital content is available on the accessing device or transmitted to another device in trusted domain 128 (FIG. 1).

Following block 190, process 180 returns to Calculate Expiration block 186 and processing continues as described above. The time expired between iterations through blocks 186, 188 and 190 depends upon the desired granularity, or how often the DTI is reduced and persisted. In any event, the device is assumed to be working within the policy agreed to when the content was acquired. Typically, the granularity is small compared to the DTI and the ATI, for example, once per second. The iterations through blocks 186, 188 and 190 continue as long as the accessing device is active, the accessing is not interrupted by the user or the content expires. In the event the device is deactivated or the accessing of digital content 114 is stopped by a user, an asynchronous interrupt 198 is activated and process 180 proceeds to an "End Access Content" block 199 in which process 180 is complete.

If during block 188 process 180 determines that the content has expired, control proceeds to a "Delete Policy?" block 192 during which process 180 determines whether or not the usage policy stored in conjunction with digital content 114 requires that digital content 114 be destroyed or deleted from data storage 112 upon an expiration of the license. If so, process 180 proceeds to a "Delete Content" block 194 during which process 180 takes action to erase digital content 114 from data storage 112 so that there can be no further access. Process 180 then proceeds to a "Deny Access" block 196 during which access to digital content 114 is denied, typically with a message to the user or entity attempting to gain access.

If during block 192 process 180 determines that digital content 114 is not subject to a deletion policy upon expiration, then process 180 proceeds to Deny Access block 196 and processing continues as described above. Once access is denied during block 196, process 180 proceeds to "End Access Content" block 199 in which, as described above, process 180 is complete. If digital content 114 is not destroyed during block 194, rather than denying access during block 196, the user may be presented with an option to extend access for an additional period of time, perhaps for an additional charge.

Figure 5:
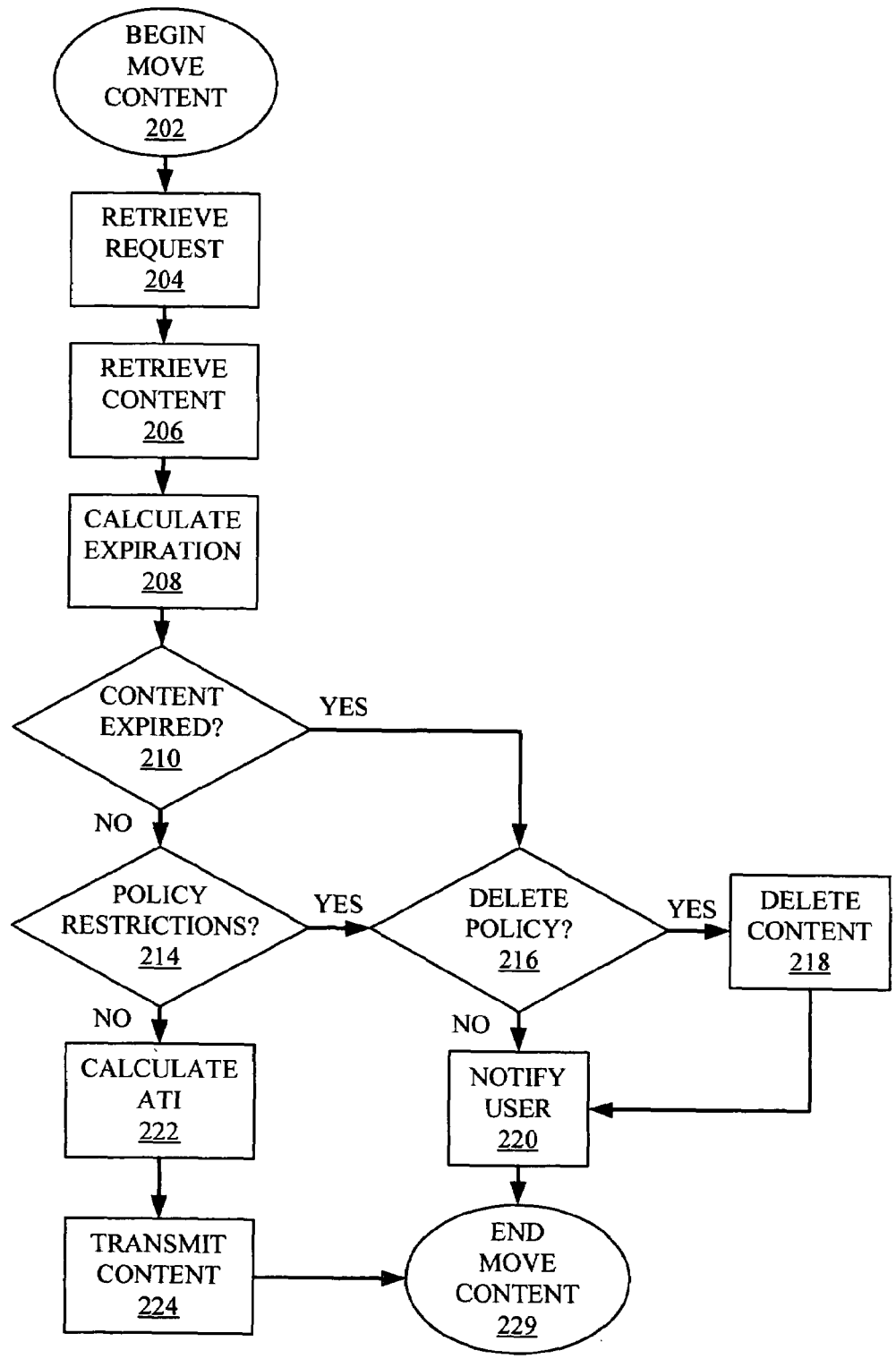
FIG. 5 is a flowchart of a Move Content process that handles the movement of content form one device in a particular trusted domain to another device in the trusted domain.

FIG. 5 is a flowchart of a Move Content process 200 that handles the movement of content from one device in a particular trusted domain, such as trusted domain 128 (FIG. 1), to another device in the particular trusted domain. Process 200 starts in a "Begin Move Content" block 202 and proceeds immediately to a "Retrieve Request" block 204. During block 204, a device that stores particular digital content, in this example, CPU 104 (FIGS. 1 and 2) storing digital content 114 (FIGS. 1 and 2), receives a request to transfer the content to another device, such as DVD/CD player 118 (FIG. 1). During a "Retrieve Content" bock 206, process 200 retrieves digital content 114 from data storage 112 (FIGS. 1 and 2).

During a "Calculate Expiration" block 208, process 200 determines a value for the DTI stored in conjunction with digital content 114 and compares the DTI against a local timer of CPU 104. The process of determining DTI during block 208 is basically the same as explained above in conjunction with Calculate Expiration block 126 (FIG. 4) of process 180 (FIG. 4). Once the DTI has been calculated, process 200 proceeds to a "Content Expired?" block 210 during which process 200 determines whether or not digital content has any access time remaining under the corresponding license. If process 200 determines that digital content 114 does not have any remaining access time, process 200 proceeds to a "Delete Policy?" block 216 during which during which process 200 determines whether or not the usage policy stored in conjunction with digital content 114 requires that digital content 114 be destroyed or deleted from data storage 112 (FIG. 1) upon an expiration of the license. If so, process 200 proceeds to a "Delete Content" block 118 during which process 200 takes action to erase digital content 114 from data storage 112 so that there can be no further access. Process 200 then proceeds to a "Notify User" block 220 during which an appropriate message is transmitted to the user or device that initiated the transfer process. If process 200 determines during block 216 that digital content 114 is not subject to a deletion policy, then control proceeds to Notify User block 220 and an appropriate message is transmitted to the user or device that initiated the transfer process.

If during block 210 process 200 determines that the license for digital content 114 has not expired, then process 200 proceeds to a "Policy Restrictions?" block 214 during which process 200 determines whether or not there are restrictions on the transfer of digital content 114. For example, digital content 114 may be licensed with a provision that it may not be copied to any device, such as DVD/CD player 118 (FIG. 1), that is able to produce removable media, such as an optical disc protected with CPRM 120 (FIG. 1). If so, digital content 114 is not transferred and process 200 proceeds to Delete Policy? block 216 and processing continues as described above.

If during block 214 process 200 determines that there are no relevant policy restrictions preventing transfer, then process 200 proceeds to a "Calculate ATI" block 222 during which process 200 converts DTI 116 (FIG. 1) stored in conjunction with digital content 114 back to ATI measurement. Once an ATI measurement has been attached to digital content 114, then process 200 proceeds to a "Transmit Content" block 224 during which digital content 114 and the calculated ATI are transmitted to the requesting user or entity. Of course, once the requesting entity receives digital content 114 and the ATI, the entity executes Store Content process 160, converting the ATI into a DTI that corresponds to the requirements of the requesting entity.

Finally, once digital content 114 has been transmitted during block 224 or a requesting entity notified concerning a refusal to transmit during block 220, process 200 proceeds to an "End Move Content" block 219 in which process 200 is complete.

Figure 6:
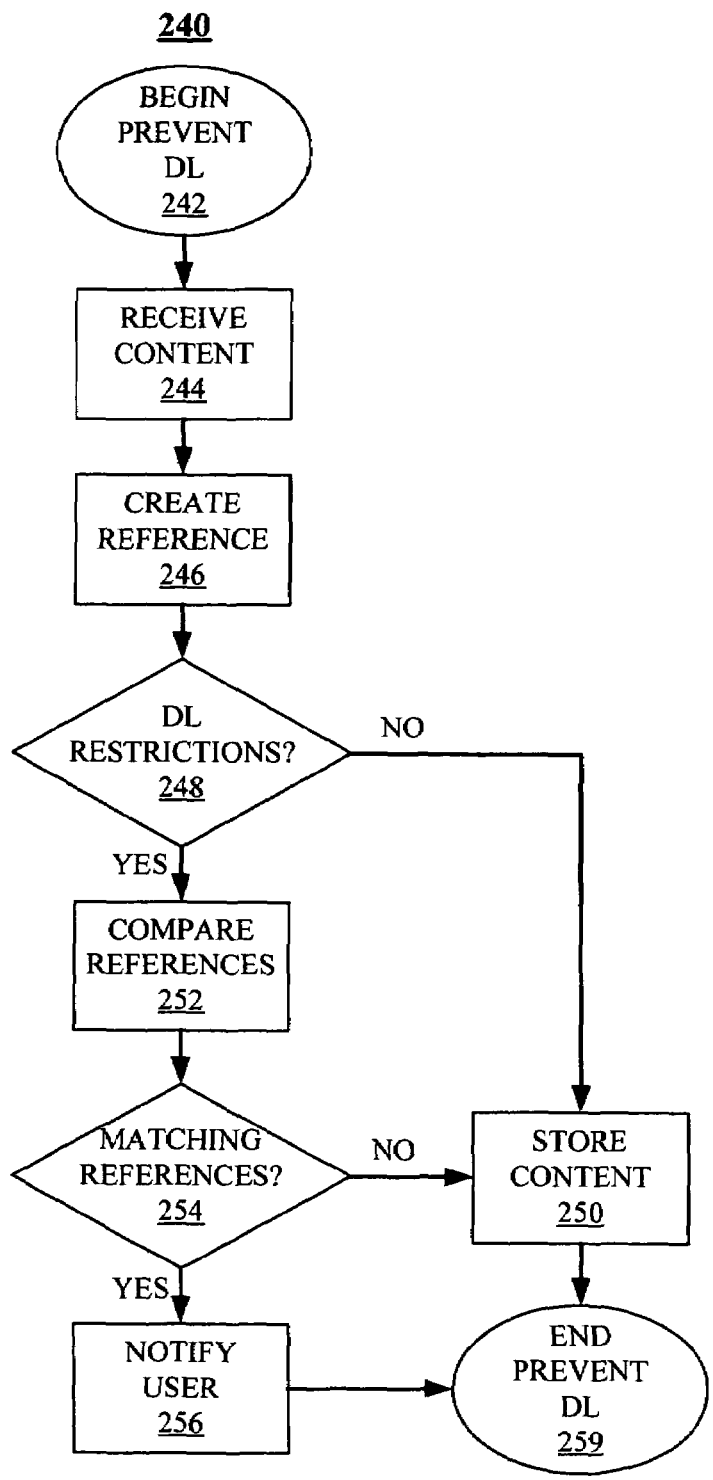
FIG. 6 is a flowchart of a Download Prevention process for preventing a user or entity from re-downloading previously expired content with a new ATI.

FIG. 6 is a flowchart of a Download Prevention process 240 for preventing a user or entity from re-downloading previously expired content with a new ATI. Process 240 starts in a "Begin Prevent Download (DL)" block 242 and proceeds immediately to a "Receive Content" block 244 during which a user or entity, in this example DVD/CD player 120 (FIG. 1) requests and receives particular content, such as digital content 114 (FIGS. 1 and 2), stored and managed in conformance with the claimed subject matter. During a "Create Reference" block 246, process 240 creates a unique reference to digital content 114 that may be stored in memory. One example of such a unique reference is the result of a hash function applied to the content or a portion of the content. Those with skill in the computing arts, should appreciate that there are many methods for creating a unique reference to a particular piece of content.

During a "DL Restrictions?" block 248, process 240 determines whether or not the content downloaded during block 244, e.g. digital content 114, or the device receiving the content, e.g. DVD/CD player 118, has a policy against allowing previously stored content form being re-downloaded. If not, process 240 proceeds to a "Store Content" block 250 during which DVD/CD player 118 stores digital content 114 by employing Store Content process 160, described above in conjunction with FIG. 3.

If during block 248, process 240 determines that either digital content 114 or DVD/CD player 118 has a policy against re-downloading, then control proceeds to a "Compare References" block 252 during which process 240 attempts to match the unique reference created during block 246 with references that have been generated and stored by DVD/CD player 118 during previous downloads of content. During a "Matching References?" block 254, process 240 determines whether or not the unique reference generated during block 246 and compared with previous references during block 252 matches any of the previous references. If not, process 240 proceeds to Store Content block 250 and processing proceeds as described above. If so, process 240 proceeds to a "Notify User" block 256 during which process 240 transmits an appropriate message to the user or device that initiated the download process.

Finally, once digital content 114 has been stored during block 250 or a requesting entity notified concerning a refusal to download during block 246, process 240 proceeds to an "End Prevent DL" block 259 in which process 240 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for managing time based digital rights control in a device that doesn't have a secure clock, comprising:
   defining a universal time interval (UTI) for a plurality of devices;
   establishing a device time interval (DTI) corresponding to a first device of the plurality of devices, wherein the DTI is a repeatable time based measurement that is convertible into UTI and based upon operational characteristics of the first device;
   associating a first availability time interval (ATI) with content subject to a rights control policy;
   receiving the content and associated first ATI at the first device;
   converting the first ATI into DTI units;
   storing the content in conjunction with the DTI units;
   modifying the DTI units based upon an a usage based control (UBC) policy;
   generating a unique identifier corresponding to the content;
   comparing the unique identifier to a previously generated and stored unique identifier;
   making a determination concerning access to the content based upon the modified DTI units and whether or not the unique identifier matches the previously generated and stored unique identifier;
   deleting the content if the determination concerning access is that the first device does not have authorization to access the content;
   receiving a request at the first device to transmit the content to a second device;
   converting the DTI into a second ATI; and
   transmitting the content in conjunction with the second ATI to the second device.

* * * * *